US011121392B2

(12) United States Patent
Cavazos Sepulveda et al.

(10) Patent No.: US 11,121,392 B2
(45) Date of Patent: Sep. 14, 2021

(54) THIN-FILM ELECTROCHEMICAL DEVICE, METHOD OF MAKING A THIN-FILM ELECTROCHEMICAL DEVICE, AND ENERGY CONVERTING DEVICE

(71) Applicant: KING ABDULLAH UNIVERSITY OF SCIENCE AND TECHNOLOGY, Thuwal (SA)

(72) Inventors: Adrián César Cavazos Sepulveda, Nuevo Leon (MX); Galo Andrés Torres Sevilla, Tungurahua (EC)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 107 days.

(21) Appl. No.: 16/340,900

(22) PCT Filed: Oct. 31, 2017

(86) PCT No.: PCT/IB2017/056764
§ 371 (c)(1),
(2) Date: Apr. 10, 2019

(87) PCT Pub. No.: WO2018/083593
PCT Pub. Date: May 11, 2018

(65) Prior Publication Data
US 2019/0237790 A1 Aug. 1, 2019

Related U.S. Application Data

(60) Provisional application No. 62/415,624, filed on Nov. 1, 2016.

(51) Int. Cl.
*H01J 19/08* (2006.01)
*H01M 8/1286* (2016.01)
(Continued)

(52) U.S. Cl.
CPC ........... *H01M 8/1097* (2013.01); *H01J 19/08* (2013.01); *H01M 4/8803* (2013.01);
(Continued)

(58) Field of Classification Search
None
See application file for complete search history.

(56) References Cited

U.S. PATENT DOCUMENTS

2006/0134504 A1 6/2006 Laurent
2008/0061027 A1 3/2008 Mangat et al.
(Continued)

OTHER PUBLICATIONS

Chen, P.-J., et al., "Design, Fabrication and Characterization of Monolithic Embedded Parylene Microchannels in Silicon Substrate," Lab On A Chip, Mar. 30, 2006, vol. 6, No. 6, The Royal Society of Chemistry.
(Continued)

*Primary Examiner* — Ashok Patel
(74) *Attorney, Agent, or Firm* — Patent Portfolio Builders PLLC

(57) ABSTRACT

A thin-film electrochemical device includes a monolithic substrate, which includes a cavity enclosed by bottom and side surfaces of the substrate, and a thin-film arranged on a top surface of the substrate and enclosing the cavity. The thin-film is permeable to ions.

15 Claims, 12 Drawing Sheets

(51) Int. Cl.
    H01M 4/88      (2006.01)
    H01M 6/40      (2006.01)
    H01M 12/08     (2006.01)
    H01M 8/1097    (2016.01)
(52) U.S. Cl.
    CPC ........... *H01M 4/8817* (2013.01); *H01M 6/40* (2013.01); *H01M 8/1286* (2013.01); *H01M 12/08* (2013.01); *Y02P 70/50* (2015.11)

(56) References Cited

U.S. PATENT DOCUMENTS

2013/0054061 A1*  2/2013  Nishimoto ........ H01M 10/0568
                                              701/22
2013/0308249 A1* 11/2013  Tamachi ............... H01M 50/44
                                              361/504

OTHER PUBLICATIONS

International Search Report in corresponding/related International Application No. PCT/IB2017/056764, dated Feb. 7, 2018.
Written Opinion of the International Searching Authority in corresponding/related International Application No. PCT/IB2017/056764, dated Feb. 7, 2018.

* cited by examiner

THIN-FILM ELECTROCHEMICAL DEVICE, METHOD OF MAKING A THIN-FILM ELECTROCHEMICAL DEVICE, AND ENERGY CONVERTING DEVICE

CROSS-REFERENCE TO RELATED APPLICATIONS

This application is a U.S. National Stage Application of International Application No. PCT/IB2017/056764, filed on Oct. 31, 2017, which claims priority and benefit from U.S. Provisional Application 62/415,624, filed Nov. 1, 2016, entitled "ELABORATION OF CHAMBERS OR CAVITIES FOR ON-CHIP PROCESSES", the entire contents of which are incorporated herein by reference.

BACKGROUND

Technical Field

Embodiments of the subject matter disclosed herein generally relate to thin-film electrochemical devices, method of making a thin-film electrochemical device, and an energy converting device comprising thin-film electrochemical devices.

Discussion of the Background

Fuel cells and batteries are increasingly being considered as alternatives to existing power sources. Recently, some research in fuel cells and batteries has focused on using thin-film electrochemical devices as energy converting devices, which can find new applications due to the reduced size of a thin-film electrochemical device compared to conventional fuel cells and batteries. Current methods of producing such devices result in structures that can be prone to leakage, which is problematic because these devices generate electricity using dangerous chemicals, such as hydrogen, lithium, etc.

FIGS. 1A-1G illustrate a conventional method of producing a thin-film electrochemical device. Initially, a substrate 102 is provided (FIG. 1A) and a protective layer 104 is deposited on top of the substrate 102 (FIG. 1B). A cavity 108 is then formed in the substrate 102 by etching the bottom side 106 of the substrate 102 (FIGS. 1B and 1C). A thin-film 110 is then formed on top of the protective layer 104 (FIG. 1D) and then a portion of the protective film 104 exposed to the cavity 108 is etched to expose a bottom side 112 of the thin-film 110 to the cavity 108 (FIG. 1E). A bottom 114 is then attached to the substrate 102, which is then sealed at the interfaces 116A an 116B between the bottom 114 and the substrate 102 (FIG. 1F). A support 118, such as a netting, is then applied on top of the thin-film 110 to provide better mechanical integrity to the thin-film 110 (FIG. 1G).

A thin-film electrochemical device formed using this method has a number of deficiencies. The most significant of these deficiencies is the requirement to attach a separate bottom 114 to the substrate 102, which then requires sealing to prevent gas/liquid leakage into the environment. The requirement for a separate bottom 114 also increases the device width, which impacts the design of devices incorporating these devices. Further, these devices can result in mechanical integrity issues due to the attachment of a separate bottom to enclose the cavity 108. Additionally, this method requires excess material to provide the bottom 114 because the corresponding portion of the substrate 102 is etched away, as well as to provide the external support 118 for increasing the mechanical integrity of the thin-film 110. Moreover, the resulting thin-film electrochemical device has only a small portion of the bottom 112 of the thin-film 110 exposed to the cavity 108, which limits device performance due to a loss of useable area of the thin-film 110.

Thus, there is a need for an improved electrochemical device and method of making such a device that does not require additional sealing to enclose the bottom of the cavity. Further, it would be desirable to avoid excess material to enclose the bottom of the cavity, as well as to provide mechanical integrity to the thin-film.

SUMMARY

According to an embodiment, there is a thin-film electrochemical device, which includes a monolithic substrate, which includes a cavity enclosed by bottom and side surfaces of the substrate, and a thin-film arranged on a top surface of the substrate and enclosing the cavity. The thin-film is permeable to ions.

According to another embodiment, there is a method of producing a thin-film electrochemical device. A substrate is provided. A cavity is formed in the substrate from a top side of the substrate. The cavity is enclosed by bottom and side surfaces of the substrate. An ion-permeable thin-film is deposited on a top side of the substrate. The ion-permeable thin-film encloses a top side of the cavity and the ion-permeable thin-film allows ions from an environment in which the ion-permeable thin-film electrochemical device is arranged to pass into the cavity or allows ions from the cavity to pass into the environment.

According to a further embodiment, there is an energy converting device, which includes a plurality of electrically coupled thin-film electrochemical devices. Each of the plurality of electrically coupled thin-film electrochemical devices includes a monolithic substrate, which includes a cavity enclosed by bottom and side surfaces of the substrate, and a thin-film arranged on a top surface of the substrate and enclosing the cavity. The thin-film is permeable to ions.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a thin-film electrochemical device.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1A:
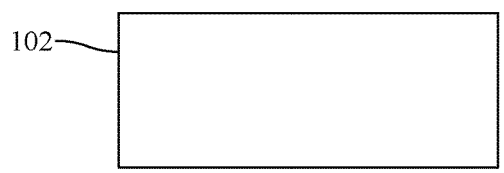
FIGS. 1A-1G are schematic diagrams of a conventional method of making a thin-film electrochemical device.
Figure 1B:
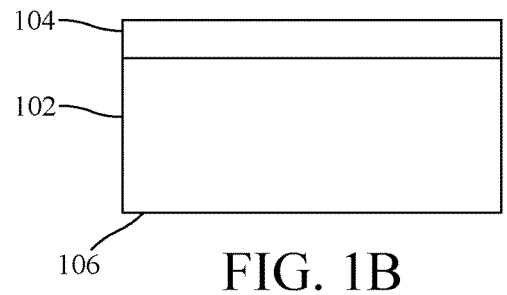
Figure 1C:
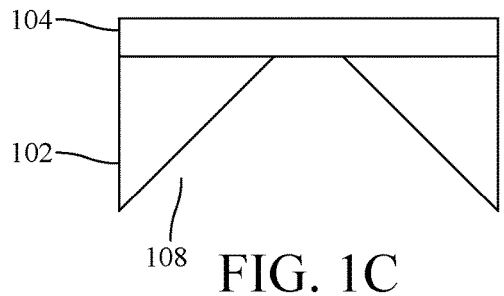
Figure 1D:
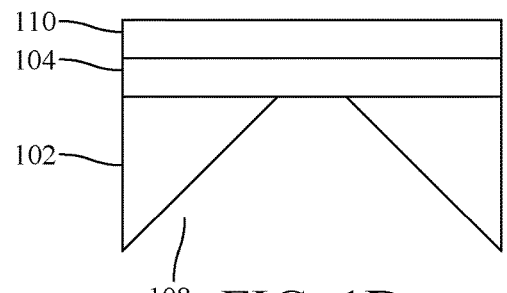
Figure 1E:
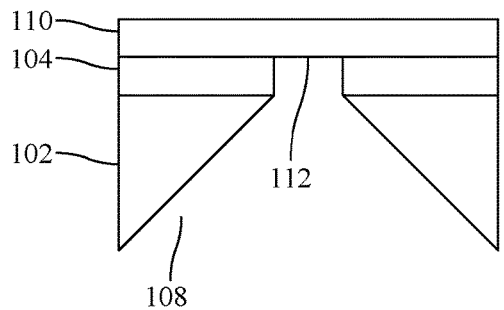
Figure 1F:
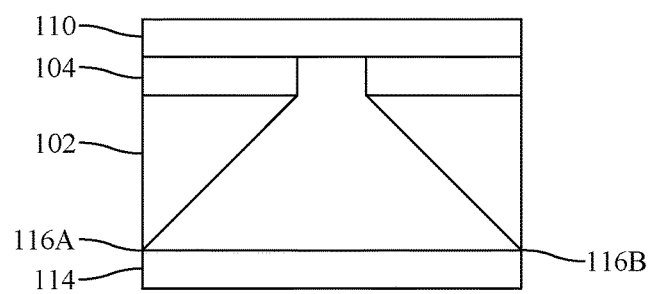
Figure 1G:
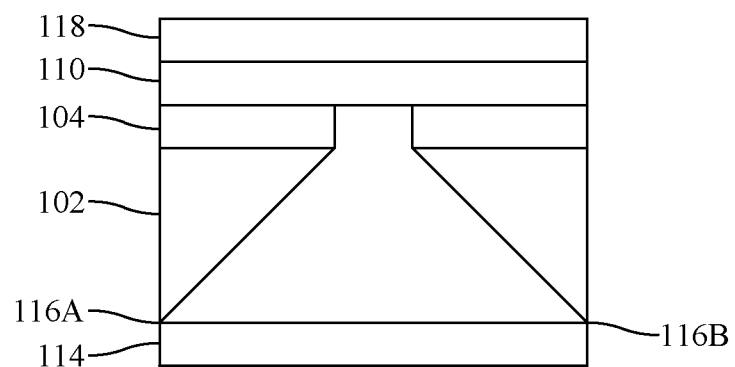
Figure 2:
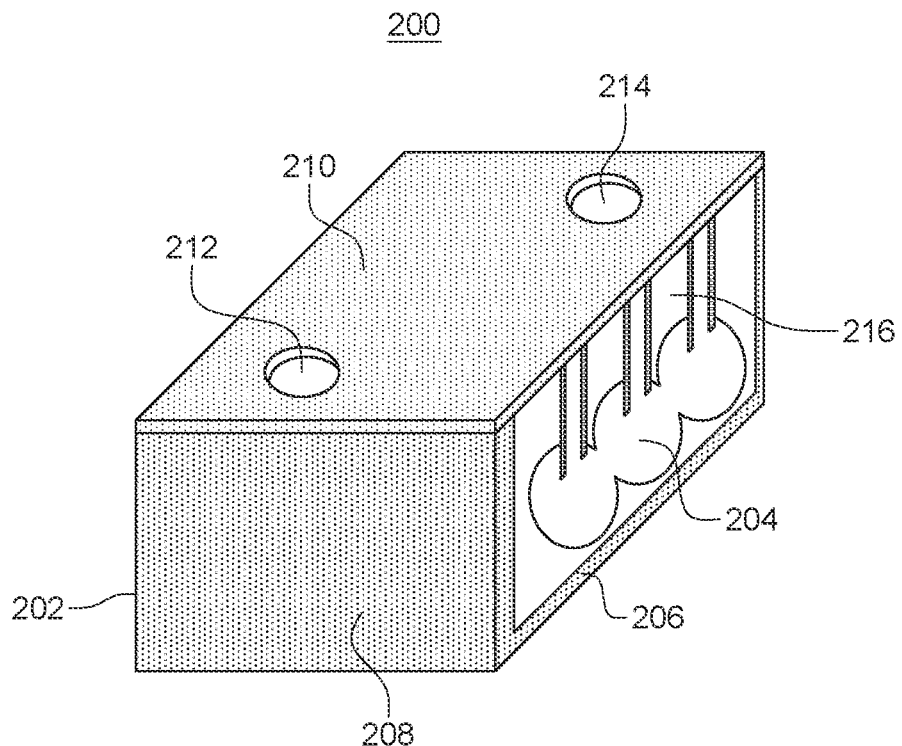
FIG. 2 is a schematic diagram of cross-sectional view of a thin-film electrochemical device an embodiment.

Referring now to FIG. 2, a thin-film electrochemical device 200 includes a monolithic substrate 202, which includes a cavity 204 enclosed by bottom 206 and side 208 surfaces of the substrate 202. A thin-film 210, which encloses the cavity 204, is arranged on a top surface of the substrate 202. The thin-film 210 is permeable to ions.

The thin-film electrochemical device 200 illustrated in FIG. 2 can be employed as a solid oxide fuel cell, metal-air electrochemical cell, an electrolyzer, a photocatalytic cell, etc. In the case of the fuel cell, the inlet 212 and outlet 214 are respectively used to supply fuel to the cavity 204 and discharge waste gasses or liquids from the cavity 204. In the case of a hydrogen-based fuel, hydrogen is supplied via inlet 212 into cavity 204. The thin-film 210 is permeable to oxygen ions or protons so that the oxygen ions or protons in the environment pass through the thin-film 210 and react with the hydrogen ions or protons to generate electricity, which can be taken from the device via electrical connections, as detailed below. The reaction between the hydrogen ($H_2$) and oxygen (O) within the cavity 204 produces water ($H_2O$), which is discharged from outlet 214. It should be recognized that, depending upon the feed rate of the hydrogen and the reaction rate within the cavity 204, some unspent hydrogen may also be discharged from outlet 214. However, the amount of discharged hydrogen is low enough to be at a safe level and not pose a risk of explosion.

The cavity 204 illustrated in FIG. 2 is contiguous so that each of three chambers illustrated in the example of FIG. 2 are interconnected so that the fuel can pass from the inlet 212 and throughout the cavity 204 to ensure an even distribution of the fuel within the cavity 204. FIG. 2 illustrates one geometric configuration of the cavity 204, which as discussed below can have other geometric configurations. Although FIG. 2 labels one of the passages through the thin-film 210 into the cavity 204 as an inlet 212 and the other as an outlet 214, these can be reversed. Similarly, the supporting portions 216, which can be referred to as columns, can likewise have a different geometric configuration, which depends upon the geometric configuration of the cavity 204.

Figure 3:
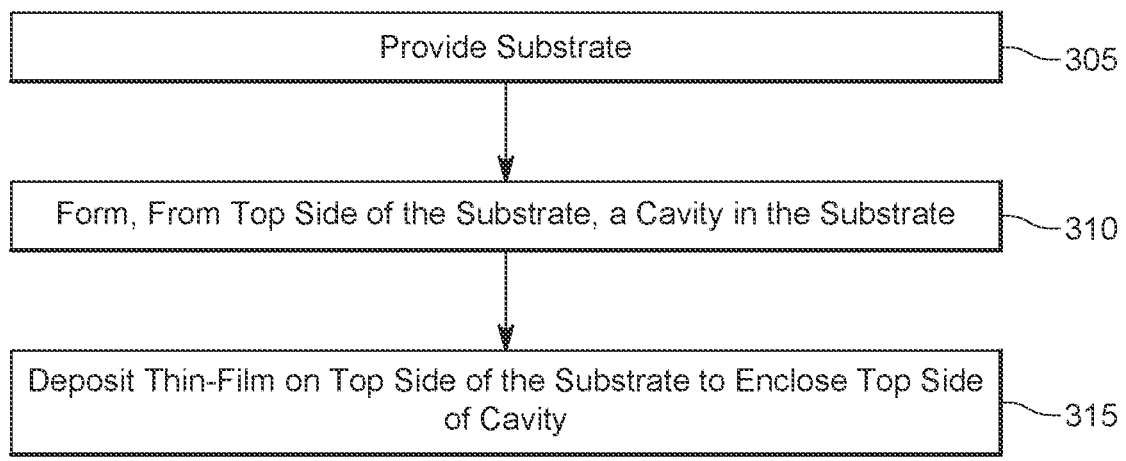
FIG. 3 is a flowchart of a method of making a thin-film electrochemical device according to an embodiment.

A method for making the thin-film electrochemical device 200 is illustrated in the flowchart of FIG. 3. Initially, a substrate 202 is provided (step 305). A cavity 204 is formed in the substrate 202 from a top side of the substrate 202 (step 310). The cavity 204 is enclosed by bottom 206 and side 208 surfaces of the substrate 202. An ion-permeable thin-film 210 is deposited on the top side of the substrate 202 to enclose a top side of the cavity 204 (step 315). The ion-permeable thin-film allows ions from an environment in which the thin-film electrochemical device 200 is arranged to pass into the cavity 204 or allows ions from the cavity 204 to pass into the environment.

By forming the cavity 204 from a top side of the substrate 202, the thin-film electrochemical device 200 provides greater structural integrity than conventional devices because the bottom of the device is part of the same contiguous substrate as the sides of the device, whereas conventional devices are made by securing and sealing a separate bottom to the bottom of the substrate. This also reduces material waste because in the conventional method the bottom of the substrate is etched away to form the cavity, whereas in the disclosed method the bottom of the substrate remains an integral part of the substrate. The increased mechanical integrity of the disclosed thin-film electrochemical device allows it to be used in portable applications, whereas the conventional devices were typically limited to portable applications.

It should be recognized that the cavity 204 need not be a completely open cavity as illustrated in FIG. 2 and instead portions of the substrate 202 can be retained to provide support to the thin-film 210. These supports can be achieved using etching and can result in one or more columns running from the bottom of the substrate and contacting a bottom of the thin-film 210. This provides additional material conservation by employing portions of the substrate to provide support to the thin-film, whereas conventional devices require an additional support to be arranged on top of the thin-film.

Another method of making a thin-film electrochemical device 200 will now be described in connection with FIGS. 4 and 5A-5I. Initially, a substrate 502 is provided (step 405 and FIG. 5A). The substrate 502 can include, either partiality or entirely, but is not limited to silicon (Si), germanium (Ge), gallium nitride (GaN), gallium arsenide (GaAs), aluminum (Al), nickel (Ni), copper (Cu), iron (Fe), indium (In), platinum (Pt), palladium (Pd), titanium (Ti), or oxides thereof. A protective layer 550 is then formed (e.g., deposited) on a top surface of the substrate (step 410 and FIG. 5A). The protective layer can be, for example, a silicon oxide ($SiO_2$) or other type of protective layer formed by oxidation, nitration, and/or other physical or chemical process.

Figure 5A:
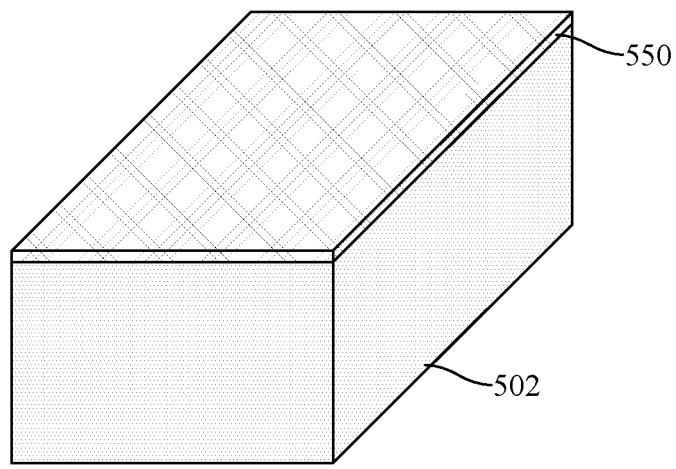
FIG. 5A-5I are schematic diagrams of a method of making a thin-film electrochemical device according to an embodiment.
Figure 5B:
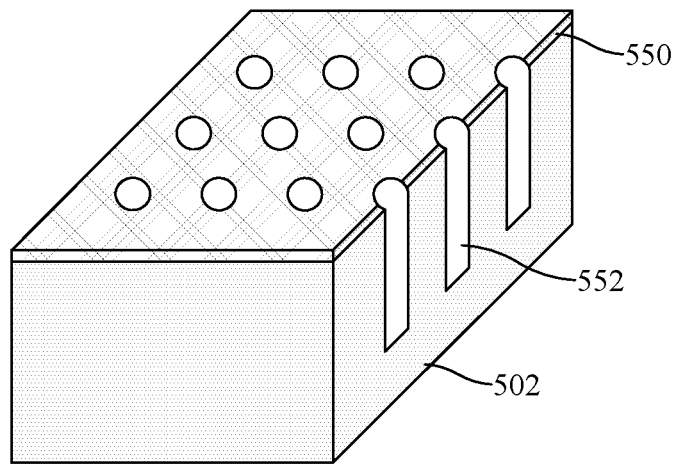
Figure 5C:
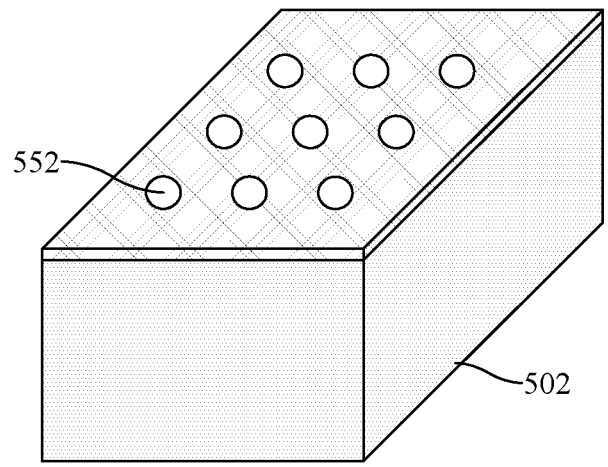

A plurality of channels 552 are etched through the protective layer 550 into the substrate 502 (step 415 and FIG. 5B). The plurality of channels 552 can be formed as a periodic lattice, variable lattice and/or random array. The etching can be performed, for example, using an etching fluid, such as a gas, liquid, and/or plasma. It should be recognized that FIG. 5B is a cross-sectional illustration and that the channels 552 are not exposed at the sides of the substrate 502. Thus, FIG. 5C illustrates an external view of the substrate 502 after the plurality of channels 552 are formed.

Figure 5D:
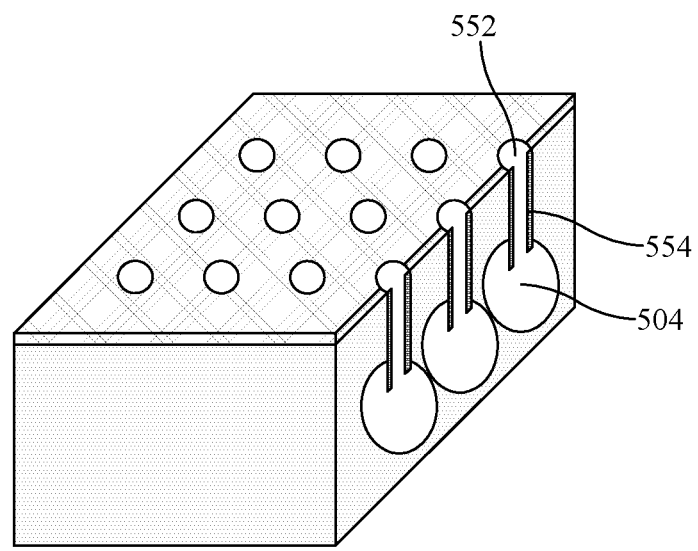

Sidewall protection 554 is then applied to the plurality of channels 552 and fluid etchants are supplied to the plurality of channels 552 to form the cavity 504 (steps 420 and 425 and FIG. 5D). The application of sidewall protection 554 is an optional step that can be performed if expansion of the channels 552 by the fluid etchants is not desired. Thus, application of the sidewall protection is an optional step that can be employed or not depending upon the desired geometry of the cavity 504, the material used, and/or the type of fluid etchants employed. The sidewall protection can be achieved by coating or modifying the channels, for example, by oxidation, nitration, and/or other physical or chemical process and/or by applying an electrical shielding. The etching can form a variable thickness cavity 504 and can be at least one of an anisotropic and isotropic etch. Forming the cavity from the top of the substrate allows for reduced thickness of the device, i.e., the distance from the top to the bottom of the device, because an additional bottom does not have to be attached to the substrate after the cavity is formed. In one embodiment, the cavity thickness can be, for example, below 100 μm. It should be recognized that FIG. 5D is a cross-sectional illustration and that the channels 552 are not exposed at the sides of the substrate 502.

Figure 5E:
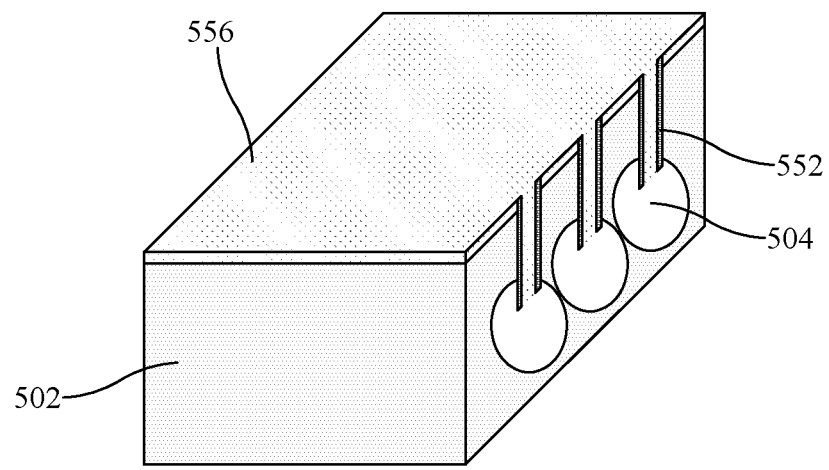

A sacrificial or functional layer 556 is formed on the top surface of the substrate 502 to cover the holes of the plurality of channels 552 in the top surface of the substrate 502 (step 430 and FIG. 5E). As illustrated in FIG. 5E, some of the material of the sacrificial or functional layer 556 extends into the plurality of channels 552 to partially or completely fill the plurality of channels 552. The sacrificial or functional layer 556 can be silicon (Si), silicon nitride ($Si_3N_4$), Ge, photoresist, polymers, metals, and/or oxides thereof. The functional layer 556 can be, for example, a semiconductor layer, an insulating layer (e.g., comprised of $AL_2O_3$), or a metallic layer (e.g., comprised of iron). The application of a sacrificial or functional layer 556 is an optional step that can be replaced by an oxidation or chemical modification of the top of the substrate 502 to cover the holes of the plurality of channels 552. It should be recognized that FIG. 5E is a cross-sectional illustration and that the channels 552 are not exposed at the sides of the substrate 502.

Figure 5F:
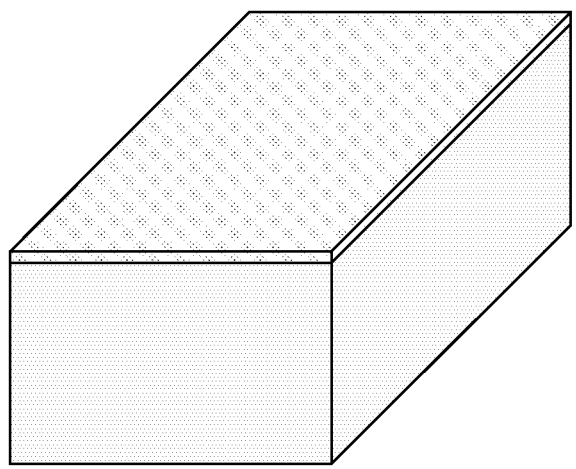

The sacrificial or functional layer 556 is then polished (step 435) to produce the structure illustrated in FIG. 5F. The polishing is a planarization of the top surface of the substrate 502 to provide a substantially uniform surface for deposition of the thin-film in the next step. The polishing can be performed using, for example, chemical and/or mechanical polishing. In some implementations, the sacrificial or functional layer 556 can be polished and/or etched to arrive back at the protective layer 550, or further polished and/or etched to expose the surface of the substrate 502. In these implementations, the holes in the top surface of the substrate 502 will still be covered because some of the material from the sacrificial or functional layer 556 will fill the upper parts of the plurality of channels 552, and thus the exposed portion of the substrate will have both substrate portions and portions filled with material from the sacrificial or functional layer 556, both portions having an upper surface in approximately the same plane to provide a smooth surface for the thin-film deposition.

Figure 5G:
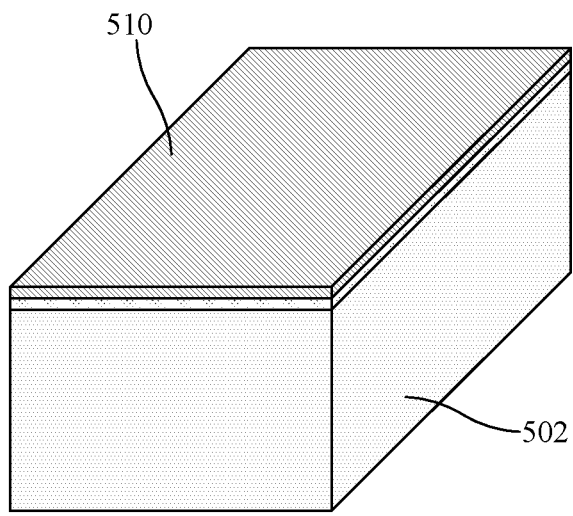

A thin-film 510 is then deposited on a top surface of the substrate 502 (step 440 and FIG. 5G). The thin-film can comprise one or more layers and can be deposited using a variety of physical or chemical techniques. For example, the thin-film 510 can be formed by deposition of platinum (Pt), nickel (Ni), cobalt (Co), cupper (Cu), yttria-stabilized zirconia (YSZ), cerium (Ce), bismuth (Bi), lithium (Li), carbon allotropes (C), their oxides, their nitrates, electrodes, catalysts, and/or other suitable material. In some embodiments, a coating, such as a photoresist, could be applied on top of the thin-film 510 to protect the thin-film 510.

Figure 5H:
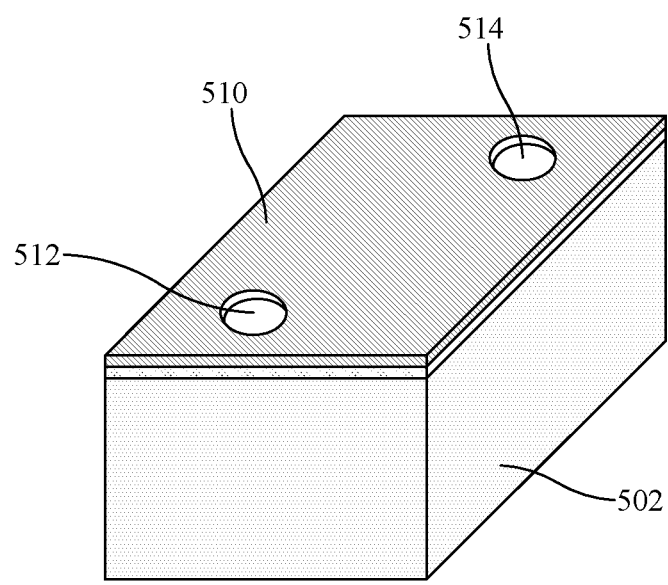

An inlet 512 and outlet 514 are then formed through the thin-film 510 to expose the cavity 504 to the environment surrounding the device (step 445 and FIG. 5H). These can be formed using a mechanical or chemical etching technique. The formation of an inlet 512 and outlet 514 are optional and are not required for all thin-film electrochemical devices, such as a metal-air electrochemical cell.

Figure 5I:
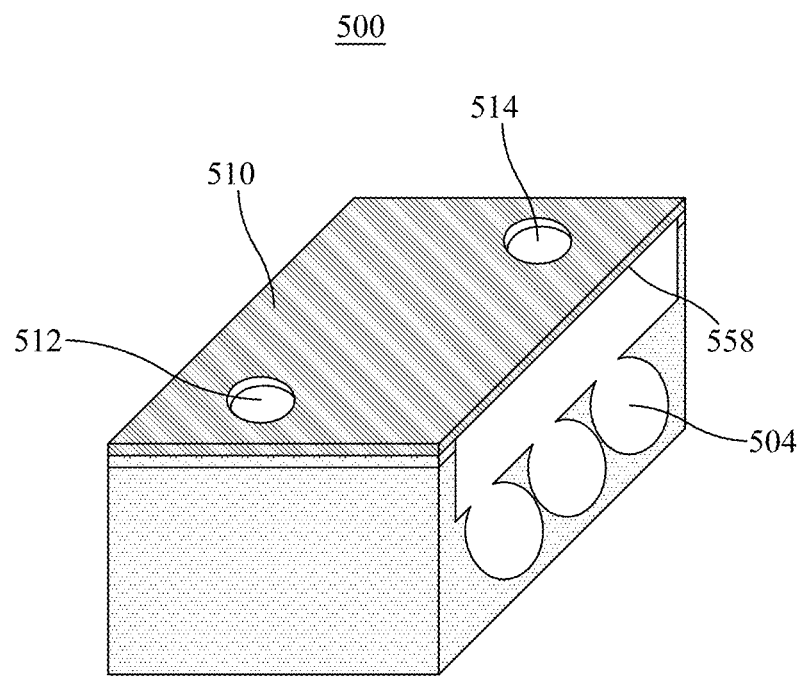

Finally, the thin-film 510 is partially or completely released from any underlying layers (e.g., the protective layer 550 and the sacrificial or functional layer 556) so the bottom 558 of the thin-film 510 is exposed to the cavity and so that portions of it are freestanding and other portions, such as the portions supported on the top edges of substrate 502 remain attached to the substrate 502 to form the thin-film electrochemical device 500 (step 450 and FIG. 5I). The thin-film 510 can be released by introducing, for example, an etching fluid, such as a gas, liquid, or plasma, into the inlet 512 and/or outlet 514 so that it flows through the cavity 504. The etching can be anisotropic and/or isotropic. The thin-film electrochemical device 500 can also have one or more thin-film layers deposited by a variety of physical or chemical methods after the thin-film 510 is released from any underlying layers. As an alternative to releasing the thin-film 510 from any underlying layers, the sacrificial or functional layer can be converted into porous layers to allow ions in the cavity 504 to pass through and onto the thin-film 510. For example, if the underlying layers are comprised of NiO, the layers can be made porous by applying hydrogen to the layer, which reduces the layer to porous Ni.

The thin-film electrochemical device illustrated in FIG. 5I has a contiguous cavity in the lateral direction (i.e., the circular areas are each connected to each other. If additional support for the thin-film 510 is desired, the circular areas can be spaced apart so that a support (e.g., a column running from the bottom of the substrate 502 to the bottom 558 of the thin-film 510) can be provided between the circular areas. This can be achieved based on the geometry of the channels 552, i.e., the channels will be spaced further apart to provide the supports between the circular areas. Although FIG. 5I illustrates the portion of the cavity between the bottom 558 of thin-film 510 and the top of the circular portions of the cavity 504 as being thicker in the vertical direction than the circular portions of the cavity 504, the circular portions can be thicker in the vertical direction than the portion of the cavity between the bottom 558 of thin-film 510 and the top of the circular portions of the cavity 504.

Figure 4:
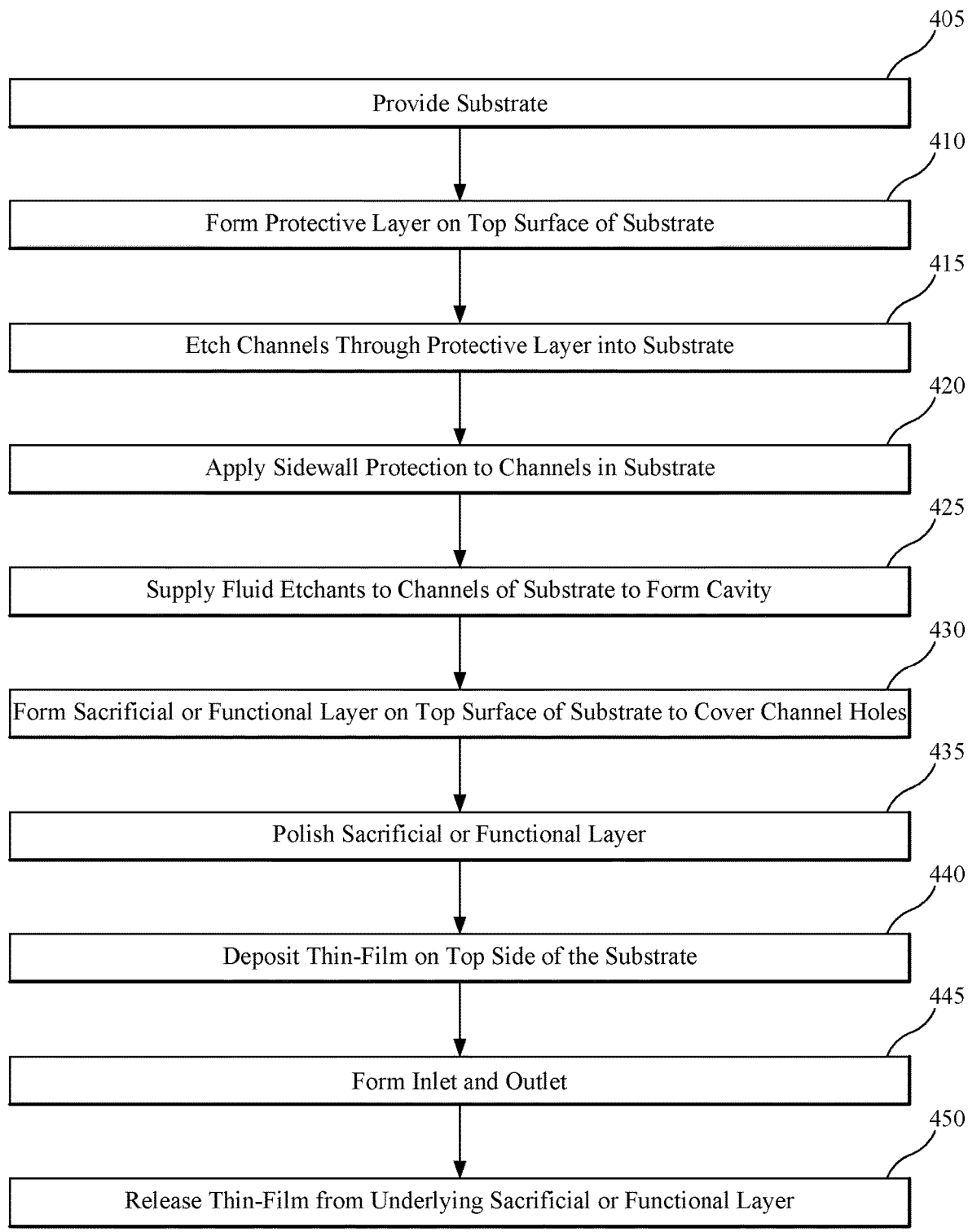
FIG. 4 is another flowchart of a method of making a thin-film electrochemical device according to an embodiment.
Figure 6:
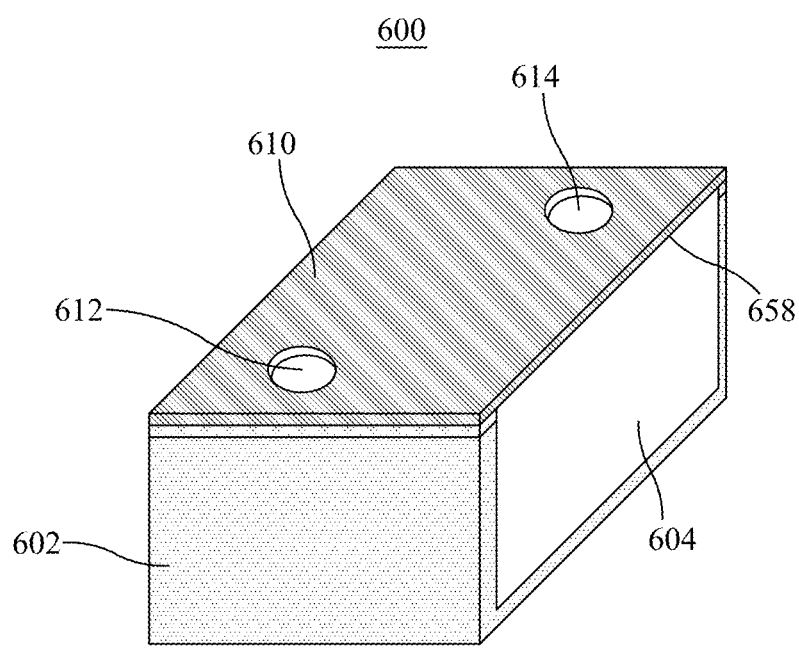
FIG. 6 is a schematic diagram of a thin-film electrochemical device formed according to the method of FIG. 3 or 4 according to an embodiment.

FIG. 6 is a schematic diagram of another thin-film electrochemical device 600 that can be formed by the methods of FIGS. 3 and 4. Similar to the device illustrated in FIG. 5I, the substrate 602 carries a thin-film 610 with an inlet 612 and outlet 614, the thin-film enclosing a cavity 604. In this embodiment, the cavity 604 is much larger than the cavity 504 in FIG. 5I. This larger cavity allows the device 600 to contain more reactants or chemicals (e.g., gasses or liquids), which allows the device to convert a greater amount of energy per unit time compared to the device 500 in FIG. 5I.

Figure 7:
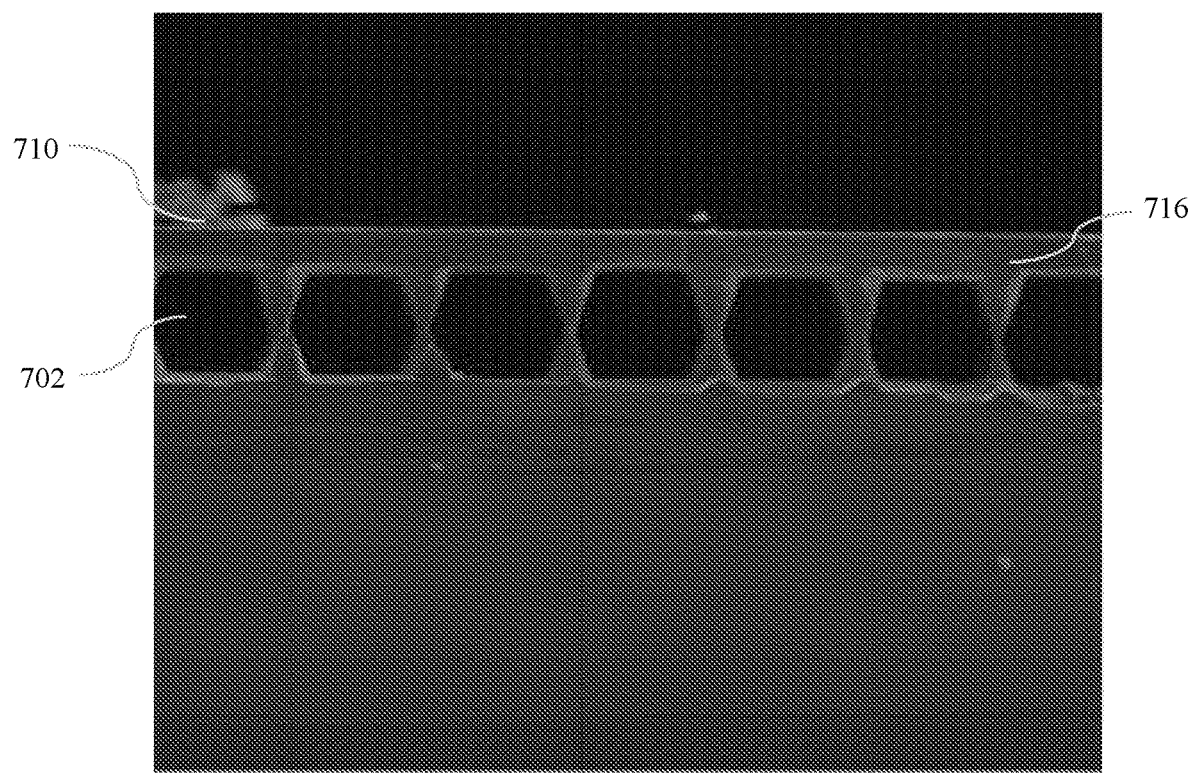
FIG. 7 is a scanning electron microscope (SEM) image of a thin-film electrochemical device according to an embodiment.
Figure 8A:
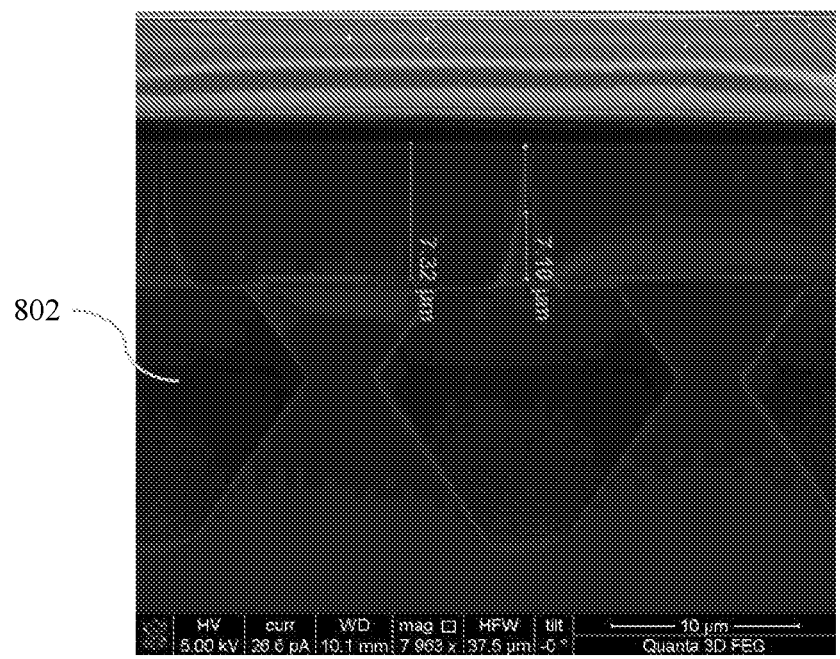
FIG. 8A is an SEM cross-sectional view image of a thin-film electrochemical device according to an embodiment.
Figure 8B:
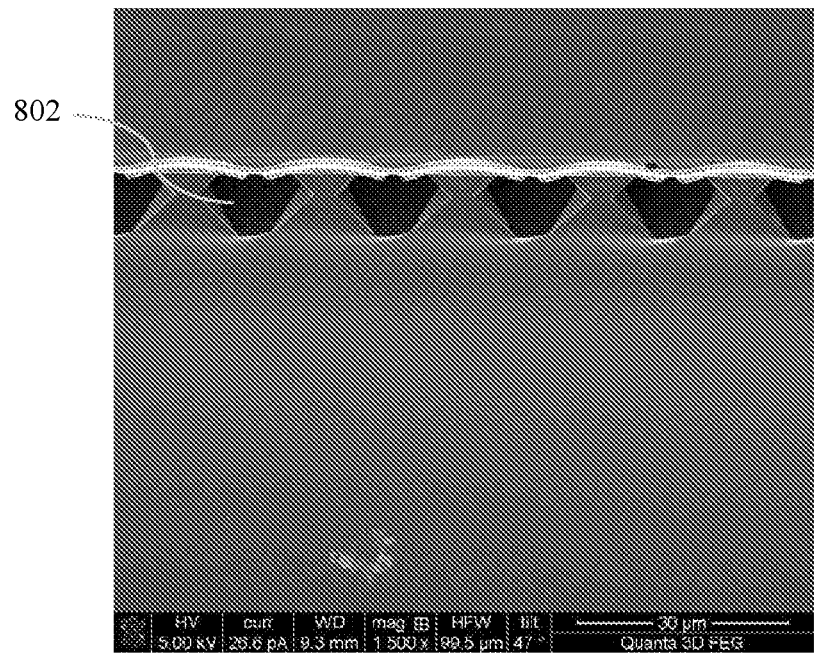
FIG. 8B is an SEM isometric view image of a thin-film electrochemical device according to an embodiment.

As discussed above, the shape of the cavity illustrated in the schematic diagrams above are two examples of different geometries for the cavity. As illustrated in FIG. 7, the cavity 702 can have a hexagonal shape bounded by integrated substrate supports 716, which support the thin-film 710. FIGS. 8A and 8B are scanning electron microscope (SEM) images of a cross-sectional view and an isometric view, respectively, of a thin-film electrochemical device having a cavity with another geometry. Specifically, the cavity 802 is hexagonal but shaped more like a diamond with two truncated points compared to the hexagonal geometry of FIG. 7. The measurements 7.32 μm and 7.10 μm represent a thickness of the sacrificial layer. These measurements are example measurements of the minimum thickness of the sacrificial layer when the sacrificial layer is a $SiO_2$ layer formed by plasma-enhanced chemical vapor deposition (PECVD). It should be recognized that other sacrificial layer thickness can be employed, and as discussed above the sacrificial layer can be omitted in certain implementations. The areas arranged laterally to the cavities 802 in FIGS. 8A and 8B are the supports for the thin-film.

Figure 9:
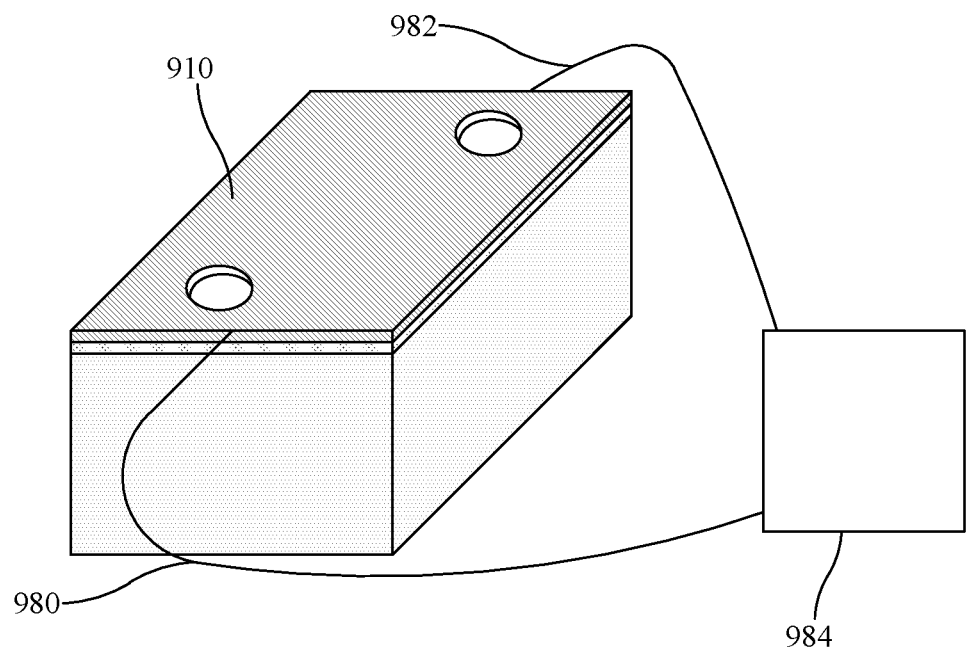
FIG. 9 is a schematic diagram of a thin-film electrochemical device coupled to a consumer of electricity according to an embodiment.
Figure 10:
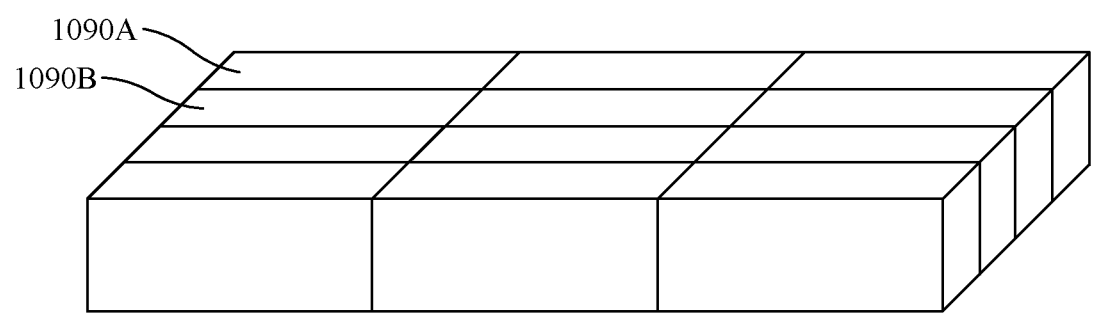
FIG. 10 is a schematic diagram of an energy converting device comprising a plurality of thin-film electrochemical devices according to an embodiment.

The thin-film electrochemical device is designed to produce and/or store energy, and thus, as illustrated in FIG. 9, electrical leads 980 and 982 connect the thin-film 910 to a consumer of electricity 984. Moreover, as illustrated in FIG. 10, an energy converting device 1000 can be comprised a plurality of thin-film electrochemical devices 1090A and 1090B (only two of which are labeled), which can be electrically coupled to each other in series and/or parallel, depending upon implementation.

Although embodiments have been described in connection with thin-film electrochemical device being an energy converting device, the disclosed device can be used in other applications, including water-splitting, topical/internal drug-delivery, and/or fluid delivery.

The disclosed embodiments provide a thin-film electrochemical device and method of making such a device. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A thin-film electrochemical device, comprising:
    a monolithic substrate, which includes a cavity defined by bottom and side surfaces of the substrate;
    a thin-film arranged on a top surface of the substrate and defining a top of the cavity, wherein the thin-film is permeable to ions; and
    an inlet and an outlet extending through the thin-film into the cavity.

2. The thin-film electrochemical device of claim 1, wherein the thin-film is an electrode that includes a first and second electrical connection.

3. The thin-film electrochemical device of claim 1, wherein the thin-film is permeable to oxide ions or protons.

4. The thin-film electrochemical device of claim 1, further comprising:
    a semiconductor layer, insulator layer, or metallic layer arranged between the thin-film and the top surface of the substrate.

5. The thin-film electrochemical device of claim 1, wherein the monolithic substrate further comprises supporting portions extending from a bottom of the cavity to a bottom of the thin-film.

6. The thin-film electrochemical device of claim 1, wherein the substrate is partially or entirely silicon (Si), silicon oxide (SiO), germanium (Ge), germanium oxide (GeO), gallium nitride (GaN), gallium nitride oxide (GaNO), gallium arsenide (GaAs), gallium arsenide oxide (GaAsO), aluminum (Al), aluminum oxide (AlO) nickel (Ni), nickel oxide (NiO), copper (Cu), copper oxide (CuO), iron (Fe), iron oxide (FeO), indium (In), indium oxide (InO), platinum (Pt), platinum oxide (PtO), palladium (Pd), palladium oxide (PdO), titanium (Ti), or titanium oxide (TiO).

7. The thin-film electrochemical device of claim 1, wherein the thin-film is partially or entirely platinum (Pt), nickel (Ni), cobalt (Co), copper (Cu), yttria-stabilized zirconia (YSZ), cerium (Ce), bismuth (Bi), lithium (Li), carbon allotropes (C), platinum oxide (PtO), nickel oxide (NiO), cobalt oxide (CoO), copper oxide (CuO), yttria-stabilized zirconia oxide (YSZO), cerium oxide (CeO), bismuth oxide (BiO), lithium oxide (LiO), carbon oxide allotropes (CO), platinum nitrate ($PtNO_3$), nickel nitrate ($NiNO_3$), cobalt nitrate ($CoNO_3$), copper nitrate ($CuNO_3$), yttria-stabilized zirconia nitrate ($YSZNO_3$), cerium nitrate ($CeNO_3$), bismuth nitrate ($BiNO_3$), lithium nitrate ($LiNO_3$), or carbon nitrate allotropes ($CNO_3$).

8. The thin-film electrochemical device of claim 1, wherein the thin-film comprises a plurality of thin-film layers.

9. The thin-film electrochemical device of claim 1, wherein the thin-film electrochemical device is a solid oxide fuel cell, a metal-air electrochemical cell, an electrolyzer, or a photocatalytic cell.

10. An energy converting device, comprising:
    a plurality of electrically coupled thin-film electrochemical devices, each comprising
    a monolithic substrate, which includes a cavity defined by bottom and side surfaces of the substrate;
    a thin-film arranged on a top surface of the substrate and defining a top of the cavity, wherein the thin-film is permeable to ions; and
    an inlet and an outlet extending through the thin-film into the cavity.

11. The energy converting device of claim 10, wherein the plurality of electrically coupled thin-film electrochemical devices are arranged adjacent to each other so that the bottoms of the substrates of the plurality of electrically coupled thin-film electrochemical devices are arranged in a plane.

12. The energy converting device of claim 10, wherein the supporting portions of the substrates of the plurality of electrically coupled thin-film electrochemical devices are integral portions of the respective substrates of the plurality of electrically coupled thin-film electrochemical devices.

13. The energy converting device of claim 10, wherein the thin-film of each of the plurality of electrically coupled thin-film electrochemical devices is permeable to oxide ions or protons.

14. The energy converting device of claim 10, wherein the substrate of each of the plurality of electrically coupled thin-film electrochemical devices is partially or entirely silicon (Si), silicon oxide (SiO), germanium (Ge), germanium oxide (GeO), gallium nitride (GaN), gallium nitride oxide (GaNO), gallium arsenide (GaAs), gallium arsenide oxide (GaAsO), aluminum (Al), aluminum oxide (AlO) nickel (Ni), nickel oxide (NiO), copper (Cu), copper oxide (CuO), iron (Fe), iron oxide (FeO), indium (In), indium oxide (InO), platinum (Pt), platinum oxide (PtO), palladium (Pd), pallidum oxide (PdO), titanium (Ti), or titanium oxide (TiO).

15. The energy converting device of claim 10, wherein the thin-film of each of the plurality of electrically coupled thin-film electrochemical devices is partially or entirely platinum (Pt), nickel (Ni), cobalt (Co), copper (Cu), yttria-stabilized zirconia (YSZ), cerium (Ce), bismuth (Bi), lithium (Li), carbon allotropes (C), platinum oxide (PtO), nickel oxide (NiO), cobalt oxide (CoO), copper oxide (CuO), yttria-stabilized zirconia oxide (YSZO), cerium oxide (CeO), bismuth oxide (BiO), lithium oxide (LiO), carbon oxide allotropes (CO), platinum nitrate ($PtNO_3$), nickel nitrate ($NiNO_3$), cobalt nitrate ($CoNO_3$), copper nitrate ($CuNO_3$), yttria-stabilized zirconia nitrate ($YSZNO_3$), cerium nitrate ($CeNO_3$), bismuth nitrate ($BiNO_3$), lithium nitrate ($LiNO_3$), or carbon nitrate allotropes ($CNO_3$).

\* \* \* \* \*